United States Patent
Topcu et al.

(10) Patent No.: US 11,011,171 B2
(45) Date of Patent: May 18, 2021

(54) PRE-EMPTIVELY INITIALIZING AN AUTOMATED ASSISTANT ROUTINE AND/OR DISMISSING A SCHEDULED ALARM

(71) Applicant: Google LLC, Mountain View, CA (US)

(72) Inventors: Nevzat Topcu, Fremont, CA (US); Michael Andrew Goodman, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 188 days.

(21) Appl. No.: 16/339,238

(22) PCT Filed: Feb. 1, 2019

(86) PCT No.: PCT/US2019/016363
§ 371 (c)(1),
(2) Date: Apr. 3, 2019

(87) PCT Pub. No.: WO2020/117295
PCT Pub. Date: Jun. 11, 2020

(65) Prior Publication Data
US 2021/0065698 A1    Mar. 4, 2021

Related U.S. Application Data

(60) Provisional application No. 62/776,255, filed on Dec. 6, 2018.

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/017* (2013.01); *G06F 9/453* (2018.02);
(Continued)

(58) Field of Classification Search
CPC ......... G10L 15/22; G10L 15/07; G10L 15/08; G10L 15/20; G10L 15/30; G10L 15/063;
(Continued)

(56) References Cited

U.S. PATENT DOCUMENTS

| 7,073,129 B1 | 7/2006 | Robarts et al. |
| 8,954,291 B2 | 2/2015 | Messenger et al. |
| 2010/0079275 A1 | 4/2010 | Seo et al. |

FOREIGN PATENT DOCUMENTS

| WO | WO2017192752 A1 | 11/2017 |
| WO | 2018053094 | 3/2018 |

OTHER PUBLICATIONS

Anonymous; "Google Home is now the best alarm clock on the market"; Android Central; retrieved from internet URL: https://web.archive.org/web/20180824113112/https://www.androidcentral.com/google-home-now-best-alarm-clock-market; 7 pages; Aug. 24, 2018.
(Continued)

Primary Examiner — Vu B Hang
(74) Attorney, Agent, or Firm — Middleton Reutlinger

(57) ABSTRACT

Implementations set forth herein relate to initializing performance of an automated assistant routine and/or dismissing an alarm pre-emptively according to satisfaction of one or more conditions. A condition can be satisfied by a user acknowledging the alarm when the alarm is going off, or causing the alarm to be dismissed prior to a time at which the alarm was scheduled for. The user can cause the alarm to be dismissed pre-emptively by interacting with the automated assistant prior to the time the alarm was scheduled for and/or interacting with a device, which is known to the automated assistant, prior to the time that the alarm was scheduled for. In this way, actions that cause an alarm to be dismissed can be recognized and used to initialize other processes, such as
(Continued)

an automated assistant routine, thereby reducing a number of inputs needed from a user.

20 Claims, 8 Drawing Sheets

(51) Int. Cl.
    *G06F 9/451*     (2018.01)
    *G08B 3/10*     (2006.01)
    *G06F 3/01*     (2006.01)
    *G06F 16/9032*     (2019.01)
    *G10L 15/08*     (2006.01)

(52) U.S. Cl.
    CPC ......... *G06F 16/90332* (2019.01); *G08B 3/10* (2013.01); *G10L 15/08* (2013.01); *G10L 2015/223* (2013.01)

(58) Field of Classification Search
    CPC ... G10L 15/1822; G10L 15/183; G10L 15/19; G10L 15/193; G06F 3/016
    See application file for complete search history.

(56) References Cited

OTHER PUBLICATIONS

European Patent Office; International Search Report and Written Opinion of Ser. No. PCT/US2019/016363; 21 pages; dated Aug. 28, 2019.

PRE-EMPTIVELY INITIALIZING AN AUTOMATED ASSISTANT ROUTINE AND/OR DISMISSING A SCHEDULED ALARM

BACKGROUND

In certain contexts, a user may request an alarm be triggered at a certain time in order to wake the user, so that the user can wake up to start their morning routine. Should the user wake before their alarm goes off, their alarm may nonetheless still be triggered at the scheduled time. Depending on the type of alarm (e.g., audio and/or visual), power and computational resources may be wasted on generating the alarm—which was not necessary since the user was already awake. Furthermore, the user may have to interrupt their routine in order to stop the alarm, thereby interrupting whatever tasks they may have been involved with before stopping the alarm. Similar mistakes can occur when the user is interacting with an automated assistant, which may be scheduled to initialize particular actions at certain times.

In many cases, before the automated assistant can interpret and respond to a user's request, it must first be "invoked," for example, using predefined oral invocation phrases that are often referred to as "hot words" or "trigger phrase." Thus, many automated assistants operate in a "default listening state" in which they are always "listening" to audio data sampled by a microphone for a limited (or finite, or "default") set of hot words. Any utterances captured in the audio data other than the default set of hot words are ignored. Once the automated assistant is invoked with one or more of the default set of hot words, it may operate in what will be referred to herein as a "speech recognition state" wherein, for at least some time interval after invocation, the automated assistant performs speech-to-text ("STT") processing of audio data sampled by a microphone to generate textual input, which in turn is semantically processed to determine a user's intent (and to fulfill that intent).

In certain contexts, a user may not be able to comfortably provide a trigger phrase, and therefore may elect not to invoke an automated assistant, such as when the user is the first one to wake in a household where others are sleeping. Furthermore, it may be computationally inefficient to always have an automated assistant operating in the "listening" state. For instance, the "listening" state may require one or more computing devices to be constantly sampling audio data that is being generated based on a microphone output. Compared to a simple push button input, such constant monitoring of a microphone output can be computationally intensive, and may also consume network bandwidth—should the audio data be processed at a separate server device.

SUMMARY

The present disclosure is generally directed to methods, apparatus, and computer-readable media (transitory and non-transitory) for dismissing a scheduled operation, to be performed by a computing device, in response to one or more conditions being satisfied. Furthermore, an automated assistant can be invoked for performing one or more actions (e.g., a routine that includes multiple actions) in response to the scheduled operation being dismissed. In this way, a number of user inputs, which would otherwise be processed by one or more computing devices, can be reduced. For instance, by triggering an automated assistant routine pre-emptively in response to a user dismissing an alarm (e.g., by tapping a button of a device), the user would not necessarily have to provide a subsequent spoken utterance for triggering the automated assistant routine. Omitting the subsequent spoken utterance in this way can preserve network bandwidth, as voice data would not need to be transmitted to a separate server for processing. Furthermore, bypassing processing data corresponding to the spoken utterance can preserve processing bandwidth, as a processor of the device receiving the spoken utterance would not have to cache and/or compress any data corresponding to the spoken utterance.

In some implementations, a user can have multiple devices connected within an environment such as their home. Each device of the multiple devices can provide access to an automated assistant, which can be invoked in response to the user providing a natural language input, such as a spoken utterance or trigger phrase. The automated assistant can perform actions or sets of action (e.g., routines) that can include creating or modifying certain settings, such as establishing an alarm and causing the alarm to go off at a particular time. For instance, the user can provide a spoken utterance to an automated assistant interface of a computing device in their bedroom by speaking, "Assistant, please set my alarm for 6:00 AM tomorrow morning." In response, the automated assistant can be invoked from the computing device and subsequently set the alarm. When the alarm is going off at 6:00 AM the next morning, an output (e.g., music) can be dismissed by the user via an explicit input for dismissing the output, such as a button tap or another spoken utterance. However, in order to prevent the alarm from going off when the user is already awake prior to the alarm, the alarm can be pre-emptively dismissed.

In order to pre-emptively dismiss the alarm, a determination of whether a situational condition has been satisfied can be made, and, when the situational condition is satisfied, the alarm can be pre-emptively dismissed. For instance, a situational condition can include a parameter that requires an indication that the user is awake, active, or otherwise not sleeping at least within a finite period of time prior to a scheduled time for the alarm to go off. As an example, the situational condition can be satisfied when the user has activated a light in their home prior to a time when the user has scheduled the alarm to go off, but after a time that the user has been sleeping for a threshold period of time. In this way, should the user get up prior to their alarm going off, and switch on a light, an output scheduled to be emitted at the scheduled time for the alarm can be omitted or bypassed.

Alternatively, or additionally, when the alarm is going off (e.g., rendering audio and/or video capable of being perceived by the user), the alarm can be dismissed when the situational condition is satisfied. As an example, the situational condition can be satisfied when the user has activated a podcast application and/or speaker in their home after a time that the user has been sleeping for a threshold period of time. Therefore, should the user get up when their alarm is going off, and activate the podcast application and/or speaker in their home, an output corresponding to the alarm going off can be dismissed. In some implementations, the alarm can continue to go off (e.g., render audio and/or video capable of being perceived by the user) when the situational condition is not satisfied. For example, when a temporal arrival of the scheduled time for the alarm occurs, and the alarm subsequently goes off, the user may not perform actions that cause the situational condition to be satisfied. As a result, the alarm can continue to go off until the situational condition, or another applicable condition, is satisfied.

In some implementations, a situational condition can be based on one or more interactions, between the user and the automated assistant, that previously occurred within a period of time of a past occurrence of an event, or in a manner in which a relationship between the one or more interactions and the event could be determined. For instance, a situational condition can be generated for any of the implementations discussed herein when a user exhibits a habit of performing one or more tasks around the time that a particular alarm has been scheduled to go off. As an example, the automated assistant can detect that the user, upon waking up, typically moves about their house, turns on their kitchen lights, and starts listening to music. This series of tasks set forth by the user can be used as a basis for establishing a situational condition, for example, in order to pre-emptively dismiss an alarm. In this way, should the user perform the series of tasks prior to their alarm going off, or when their alarm is going off, the situational condition can be considered satisfied, and the alarm can be dismissed (or pre-emptively dismissed). In some implementations, generating parameters for defining the situational condition can be based on a number of times one or more users have performed one or more tasks in the past, a context in which the user has performed the one or more tasks, one or more events related to the one or more tasks, and/or any other information suitable for use when identifying tasks relevant to a scheduled event. For instance, although a user may explicitly request their alarm be dismissed when they invoke the automated assistant to dismiss the alarm, the automated assistant can also generate a situational condition for dismissing the alarm based on the user, at least a threshold number of times (e.g., at least 10 times) in the past, having turned on their lights and adjusted their thermostat after their alarm had gone off.

In some implementations, the user can also request that the automated assistant perform a routine when their alarm goes off or is dismissed. The routine can include one or more actions to be performed by the automated assistant, and can be previously configured by the user during a dialog session between the user and the automated assistant. For example, the user can request that the automated assistant perform a "morning" routine by providing a spoken utterance such as, "Assistant, when I say 'good morning,' turn on my coffee maker, play my morning playlist, and turn on my kitchen lights." Therefore, when the user requests that the automated assistant set an alarm, the user can also request that the automated assistant perform the "morning" routine. The spoken utterance for establishing the aforementioned setting can be, for example, "Assistant, set my alarm and perform my 'good morning' routine when my alarm goes off." As a result, the automated assistant routine can be set to be initialized when a user input condition has been satisfied and/or an event condition has been satisfied. For instance, a user input condition can be satisfied by the user providing an input that is directed at dismissing the alarm when the alarm is going off. The event condition can be satisfied when a temporal arrival of an event (e.g., a time for the scheduled alarm has temporally arrived) corresponding to the event condition has occurred. Therefore, when either the alarm has gone off and/or the user has dismissed the alarm with a particular user input (e.g., a spoken utterance or a gesture to an interface of a computing device), the "morning" routine can be initialized by the automated assistant.

In some implementations, the user can request that the automated assistant set the alarm and perform a routine when the alarm goes off or is dismissed, and the automated assistant can perform the routine when the alarm is pre-emptively dismissed and/or a situational condition is satisfied. In other words, despite the user requesting the routine be performed in response to the alarm going off or the user dismissing the alarm, the routine can still be initialized prior to the time scheduled for the alarm to go off. As an example, the user can set the alarm to go off at 6:00 AM the next morning, and request that the "good morning" routine be performed when the user dismisses the alarm. However, if the user awakes prior to 6:00 AM and interacts with the automated assistant by providing a spoken utterance without initializing the "good morning" routine (e.g., "Assistant, what's the weather?"), the automated assistant can be on notice that the user is awake prior to the time for the alarm (i.e., 6:00 AM), thereby satisfying the situational condition. As a result of the automated assistant acknowledging that the user is awake prior to the time scheduled for the alarm to go off, the automated assistant can initialize performance of the routine and cause an output, corresponding to the alarm, to be dismissed or omitted. Therefore, when a temporal arrival of the time for the alarm (e.g., 6:00 AM) subsequently occurs, the output would not be provided by the computing device and the automated assistant would have already initialized performance of the routine.

Pre-emptively affecting a status of particular operations in this way, without necessarily requiring a user input to be processed, can preserve computational resources that would otherwise be used to process duplicative user inputs. For instance, in scenarios where the user would have to provide a spoken utterance to dismiss their alarm—in order to cause the alarm to be dismissed and an automated assistant routine to be initialized—the spoken utterance may be processed by one or more devices, using various speech processing techniques. However, because an input, which is not directly intended to affect the alarm and/or the automated assistant routine, can, nonetheless, be used to dismiss the alarm and initialize the automated assistant, the need to store, transmit, and/or process the user input (e.g., a spoken utterance) can be eliminated.

In some implementations, an ongoing operation can be modified when one or more conditions, set forth by a user, are satisfied. An ongoing operation can be an operation that is currently being performed by one or more computing devices, and optionally via an automated assistant. For instance, a user can request that an automated assistant provide audio playback of certain media, and when the media is being audibly rendered for a user, the playback of the media can be considered an ongoing operation. Alternatively, or additionally, when the user requests that an automated assistant set an alarm for a particular time, and the alarm subsequently goes off at that particular time, the alarm being audibly rendered can be considered an ongoing operation. As discussed herein, an ongoing operation can be modified when one or more conditions, which have been specified by a user, are satisfied during the ongoing operation. In some implementations, the one or more conditions can be specified by a user, established by an automated assistant, pre-configured at one or more computing devices, learned over time by one or more computing devices using interaction data corresponding to interaction(s) between one or more users and the one more computing devices, and/or otherwise can be characterized by data accessible to an automated assistant.

In some implementations, a user can request that the automated assistant set an alarm by providing a spoken utterance such as, "Assistant, set an alarm for 6 A.M. tomorrow morning, and dismiss the alarm when I turn on the news in the living room." In response to receiving the spoken utterance, the automated assistant can cause an alarm to be set for the specified time, and generate data characterizing the condition for dismissing the alarm. Specifically, the automated assistant can cause a setting to be established for dismissing the alarm when the user turns on the news in their living room using one or more devices in their living room. As a result, when the alarm is audibly rendered the next day at 6 A.M., the audible rendering of the alarm will be dismissed or stopped when news media is being accessed and/or rendered at one or more computing devices in a living room of a home of the user. In some implementations, a status of one or more devices can be accessed in response to the alarm going off in order to determine whether one or more conditions associated with dismissing the alarm have been satisfied. Alternatively, or additionally, statuses of a subset of devices associated with the condition (e.g., devices within the living room, rather than the entire home) can be determined specifically when the alarm is going off, and/or in response to the alarm going off. Therefore, when a status of one or more devices of the subset of devices corresponds to a playback of news media, the automated assistant can cause the rendering of the alarm to be dismissed, as requested by the user via the spoken utterance.

In some implementations, modification of ongoing operations can be at least partially contingent upon determining which particular user is attempting to satisfy the condition (s). In other words, in some implementations, in order for an ongoing operation to be modified, one more computing devices can require that a specified user be the one performing certain actions in order to satisfy one or more conditions. As an example, a user that caused an ongoing operation to occur—and also set forth the one or more conditions for modifying the ongoing operation, can be the user that must satisfy the one or more conditions in order for the ongoing operation to be modified. For instance, a first user and a second user can be associated with a particular assistant device within a home, and the first user can provide the assistant device with a spoken utterance such as, "Assistant, when I return home and turn on my lights, play my 90's playlist." In response to receiving the spoken utterance, the assistant device can generate a setting in which the assistant device renders audible media corresponding to a 90's playlist when the first user returns to their home and turns on the lights. In order to verify whether the first user—and not the second user, has returned home—data specifically associated with one or more users (e.g., the first user and/or the second user) can be accessed in order to verify whether the first user has returned home. Such data can, with permission from the user, include GPS data provided by a portable electronic device, such as a cell phone, security alarm data associated with the home of the first user and the second user, vehicle data associated with the first user, client data accessible via one or more client devices accessible to the first user, and/or any other data with which a user can indicate their presence to an automated assistant.

In some implementations, a voice signature of the user, or voice identification of the user, can be identified to determine whether a particular user is home and/or is otherwise acting in furtherance of satisfying one or more conditions. For example, when the user arrives home, the user may provide a spoken utterance to the automated assistant, and, in response, the automated assistant can determine that a voice characteristic of the user corresponds to a voice signature of the first user. Therefore, at least one condition previously specified by the first user would be satisfied. Subsequently, if the user requests that a light be turned on, or otherwise turns on a light within their home, another condition will be satisfied, and the automated assistant can cause the playback of the 90s playlist to be rendered, at least according to the aforementioned example.

In some implementations, conditions for modifying an ongoing operation can be based on interactions between a user and an automated assistant, and/or interactions between a user and a device via which an automated assistant is not directly accessible. For instance, the user can provide a spoken utterance, such as, "Assistant, when I make coffee in the morning, read my schedule for the day." A coffee maker within the home of the user may not be a smart device, or otherwise connected to a local area network. However, the automated assistant can determine that the user is making coffee according to one or more situational conditions and/or characteristics typically exhibited when the user is making coffee. For instance, in response to the user requesting that an operation be contingent upon "making coffee," the automated assistant can be invoked and/or otherwise responsive to the sound of a percolator, an image of a cup or pot of coffee, a smell corresponding to coffee, and/or any other detectable environmental characteristic attributable to a process of making coffee. In this way, the user can give the automated assistant permission to detect various happenings, characteristics, and/or tasks performed at the direction of the user, in order to determine whether a particular requested condition has been satisfied.

In some implications, other data can be used in combination with determined situational characteristics in order to verify that a user who has requested the creation of the condition is the one causing a particular condition to be satisfied. For instance, with prior permission from the user, voice data, facial recognition data, and/or any other user permitted data can be processed to verify which user is satisfying a particular condition. As an example, if the user had provided a spoken utterance prior to making coffee, the automated assistant can process the spoken utterance to verify who provided the spoken utterance and therefore deduce that the same user made the coffee. Therefore, any action (e.g., such as reading a schedule for the day) that depends on a particular user making coffee (or any other condition), can be initialized when the user provides a spoken utterance (from which a voice characteristic can be determined) and subsequently satisfies a condition (e.g., making coffee, which can provide environmental changes, such as mechanical noise and changes in temperature).

The above description is provided as an overview of some implementations of the present disclosure. Further description of those implementations, and other implementations, are described in more detail below.

In some implementations, a method implemented by one or more processors is set forth as including operations such as receiving a user input that causes a computing device to generate a setting for controlling a wake alarm when any one of one or more conditions is satisfied, wherein the computing device provides access to an automated assistant and the user input is received at an automated assistant interface of the computing device. The operations can further include accessing, when the computing device is operating, data that provides an indication of whether any one of the one or more conditions has been satisfied, wherein the one or more conditions include at least an event condition and a situational condition, and wherein the situational condition is satisfied when the user has performed one or more interactions with the automated assistant within a threshold period of time of an event corresponding to the event condition, and the one or more interactions are selected to satisfy the situational condition based on one or more other interactions, between the user and the automated assistant, that previously occurred within a period of time of a past occurrence of the event. The operations can further include determining, based on accessing the data, whether the data indicates that the any one of the one or more conditions has been satisfied. The operations can further include, when the situational condition is determined to be satisfied prior to satisfaction of the event condition: causing performance of the wake alarm to be dismissed, such that an output corresponding to the wake alarm is omitted when the event subsequently occurs.

In some implementations, the event is an occurrence of a particular time and performance of the wake alarm includes causing a sound to be emitted from the computing device or a separate computing device. In some implementations, the operations can further include, when the event condition is determined to be satisfied by a temporal arrival of the event: causing the wake alarm to be executed such that the output, corresponding to the wake alarm, is provided by the computing device or a separate computing device. In some implementations, the one or more conditions include at least one condition further selected from a user input condition, and the method further comprises: when the user input condition is determined to be satisfied prior to the event subsequently occurring: causing the wake alarm to be dismissed, such that the output, corresponding to the wake alarm, is omitted when the event subsequently occurs. In some implementations, the event condition includes at least a temporal parameter that identifies a particular time that, when a temporal arrival of the particular time occurs, causes the event condition to be satisfied. In some implementations, the automated assistant is configured to perform a routine and cause multiple different actions to be initialized when performing the routine, and wherein the multiple different actions of the routine include causing a separate computing device to perform another wake alarm that causes the separate computing device to provide a different output, which is directly perceivable by a user. In some implementations, the operations can further include when the situational condition is determined to be satisfied prior to the event that corresponds to the event condition: causing the automated assistant to initialize performance of the routine, prior to the event, in response to determining that the situational condition has been satisfied. In some implementations determining whether the data indicates that that any one of the one or more conditions has been satisfied includes determining that the data indicates that a user has provided a spoken utterance, which has invoked the automated assistant prior to the event. In some implementations, causing the automated assistant to initialize performance of the routine includes causing the automated assistant to perform an action that is different from a requested action specified by the user via the spoken utterance.

In other implementations, a method implemented by one or more processors is set forth as including operations such as receiving a first user input that causes a computing device to generate a setting for performing an operation when an event occurs, wherein the computing device provides access to an automated assistant that is configured to perform a routine and cause multiple different actions to be initialized when performing the routine. The operations can further include receiving a second user input that causes the automated assistant to generate another setting for performing the routine when any one of one or more conditions is satisfied, wherein the one or more conditions include at least one condition selected from a user input condition, and the user input condition is satisfied when the user has caused the operation to be dismissed during a particular time selected from a time prior to the event and another time after the event. The operations can further include accessing, subsequent to the first user input and the second user input, data that provides an indication of whether the any one of the one or more conditions has been satisfied. The operations can further include determining, based on accessing the data, that the data indicates that the any one of the one or more conditions has been satisfied. The operations can further include, when the data indicates the user input condition has been satisfied at the time prior to the event: causing performance of the operation to be dismissed, such that an output, to be provided by the computing device and corresponding to the operation, is omitted when the event subsequently occurs, and causing the automated assistant to initialize performance of the routine, prior to the event, in response to determining that the any one of the one or more conditions has been satisfied.

In some implementations, the data indicates that the user input condition has been satisfied by a third user input for causing the operation to be dismissed at the time prior to the event. In some implementations, the third user input is a physical gesture, the operation is the computing device providing an audible alarm output, and the event is a temporal arrival of a particular clock time. In some implementations, the operations can further include, when the data indicates that the user input condition has been satisfied at the other time after the event: causing the output, being provided by the computing device according to the setting, to be dismissed in response to a third user input from the user, and causing, in response to the third user input from the user, the automated assistant to initialize performance of the routine at the other time after the event. In some implementations, the one or more conditions include at least one condition further selected from a situational condition, and the method further comprises: when the data indicates that the situational condition has been satisfied at the time prior to the event: causing performance of the operation to be dismissed, such that the output, to be provided by the computing device and corresponding to the operation, is omitted when the event subsequently occurs, and causing the automated assistant to initialize performance of the routine, prior to the event, in response to determining that the situational condition has been satisfied. In some implementations, the situational condition includes at least an input parameter that identifies a particular user input that, when received at a separate computing device, causes the data to be generated for indicating that the situational condition has been satisfied. In some implementations, the particular user input corresponds to a spoken utterance, provided by the user, to an automated assistant interface of the separate computing device, and the spoken utterance characterizes a request for the automated assistant to perform a particular action that is omitted from the routine.

In yet other implementations, a method implemented by one or more processors is set forth as including operations such as receiving data that characterizes a first operational status of a first computing device and a second operational status of a second computing device, wherein each of the first computing device and the second computing device provide access to an automated assistant that is configured to be responsive to natural language inputs from a user and perform a routine that includes initializing multiple different actions to be performed. The operations can further include determining, based on the data, that the first operational status indicates the first computing device is scheduled to perform an operation in response to at least an event condition being satisfied, and the second operational status indicates that the second computing device is to perform an action of an automated assistant routine in response to a condition being satisfied, wherein the condition is a particular condition selected from a user input condition, a situational condition, and the event condition. The operations can further include receiving, subsequent to receiving the data, other data that characterizes a presence of the user within an environment that includes the first computing device and the second computing device. The operations can further include determining, based on the other data, whether the condition has been satisfied. The operations can further include, when the situational condition is determined, based on the other data, to have been satisfied prior to an event that corresponds to the event condition: causing performance of the operation to be dismissed, such that an output, to be provided by the first computing device and corresponding to the operation, is omitted when the event subsequently occurs, and causing the automated assistant to initialize performance of the routine, prior to the event, in response to determining that the situational condition has been satisfied.

In some implementations, the operations can further include, when the event condition and the situational condition are determined, based on the data, to be satisfied and the first computing device is providing the output subsequent to the event: causing the first computing device to discontinue providing the output, and causing the automated assistant to initialize performance of the routine, prior to the event, in response to determining that the situational condition has been satisfied. In some implementations, the event is a temporal arrival of a clock time and the situational condition is satisfied when, at least, the presence of the user, characterized by the other data, indicates the user has changed locations within the environment. In some implementations, the output is an audible output that is directly perceivable by the user, and is provided by the first computing device via a speaker that is configured to provide a natural language output to the user during performance of the routine by the automated assistant. In some implementations, the action of the automated assistant routine includes causing a particular device selected from the first computing device and the second computing device to download additional data, which has been generated at a server device, and cause the particular device to provide a particular output, which is based on the additional data, from an automated assistant interface of the particular device. In some implementations, the action of the automated assistant routine includes causing a particular device, which is different from the first computing device and the second computing device, to perform another operation that is different from the operation that the first computing device is scheduled to perform.

In yet other implementations, a method implemented by one or more processors is set forth as including operations such as receiving a first user input that causes a computing device to generate a setting for performing an action when an event occurs, wherein the computing device provides access to an automated assistant and the first user input is received at an automated assistant interface of the computing device. The operations can further include receiving, via the automated assistant interface of the computing device, a second user input that causes the automated assistant to generate another setting for causing a modification of a performance of the action in response to any one of one or more conditions being satisfied, wherein the one or more conditions are specified by a user via the second user input. The operations can further include, when the event occurs subsequent to receiving the first input and the second input: causing the action to be performed in response to the event occurring, accessing, subsequent to causing the action to be performed, data that provides an indication of whether the any one of the one or more conditions has been satisfied, and when the data indicates the any one of the one or more conditions was satisfied after the event occurred: causing performance of the action to be modified according to the setting.

In some implementations, the one or more conditions include: determining that a status of a device has been modified, and verifying that the user who provided the first user input and/or the second user input also performed the modification to the status of the device. In some implementations, the data includes audio data and the method further comprises: when the event occurs subsequent to receiving the first input and the second input: determining that the audio data corresponds to a voice signature of the user who provided the first user input and/or the second user input. In some implementations, the operations further include, when the event has not occurred but the any one of the one or more conditions is satisfied prior to the event occurring: causing performance of the action to be dismissed such that an output, to be provided by the computing device in accordance with the action, is omitted when the event subsequently occurs.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
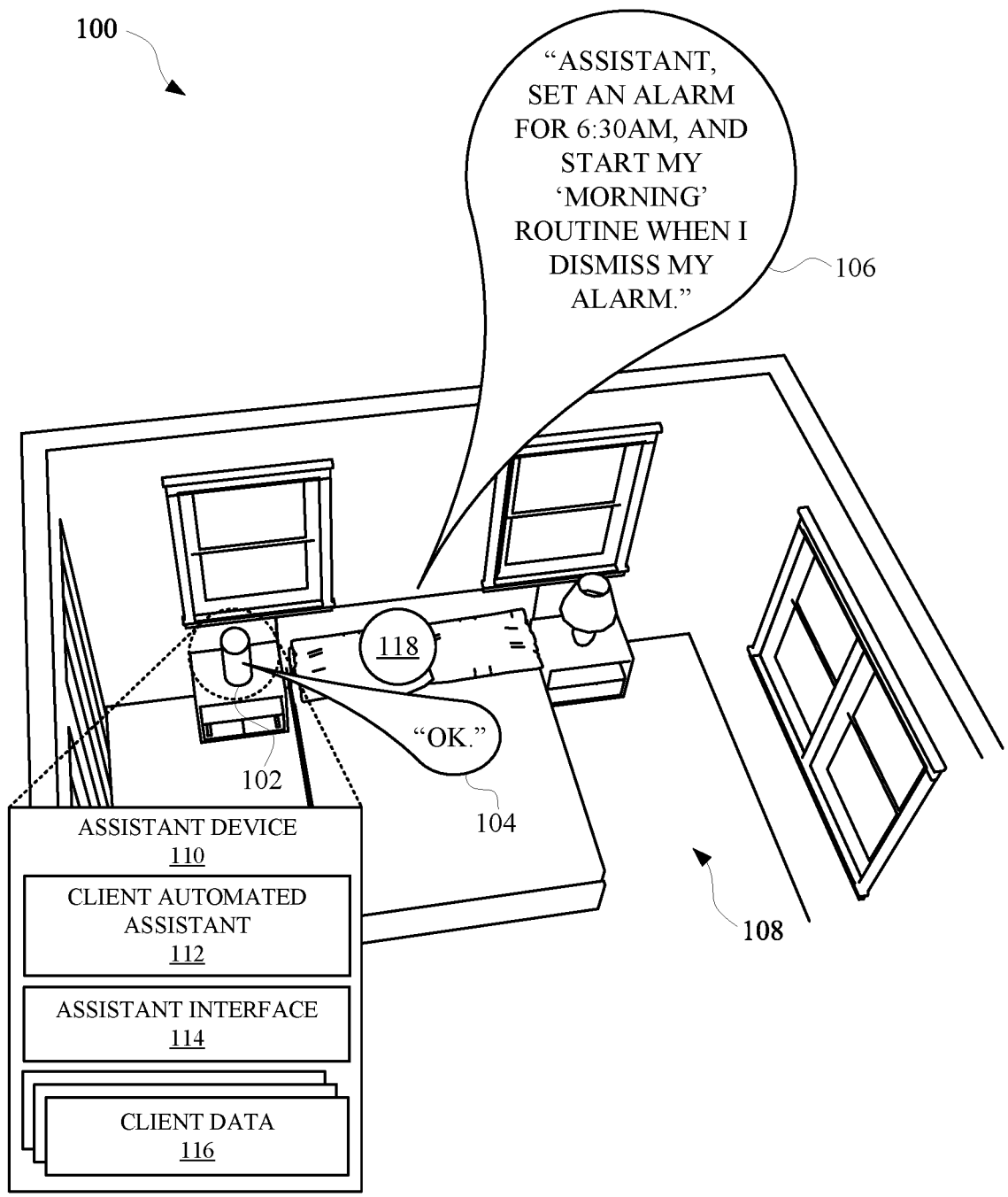
FIG. 1A illustrates a view of a user requesting that a setting be generated at an assistant device.

FIG. 1A illustrates a view 100 of a user 118 requesting that a setting be generated at an assistant device 110. Specifically, the user 118 can provide a spoken utterance 106 when they are in their room 108, in order to generate a setting that will affect a function of an automated assistant. The generation of the setting can be requested by the user 118 in order to indicate a dependency of execution of an automated assistant routine on one or more particular conditions, operations, occurrences, and/or any other characteristic or action that performance of a routine can be based on. For example, the user 118 can provide a spoken utterance 106 such as, "Assistant, set an alarm for 6:30 A.M., and start my morning routine when I dismiss my alarm." The spoken utterance 106 can be received at an assistant device 110, such as a standalone speaker device 102, which includes an assistant interface 114, such as a microphone, speaker, and/or any other apparatus capable of receiving an input and/or providing output. In response to the assistant device 110 receiving the spoken utterance 106, the assistant device 110 can provide a natural language output 104 such as, "Ok," thereby confirming receipt of the spoken utterance 106.

The spoken utterance 106 can be processed at the assistant device 110 and/or a remote device, such as a server device, in order to generate client data 116. The client data 116 can characterize a setting generated in response to the client automated assistant 112 receiving a request that is based on the spoken utterance 106. Specifically, the client data 116 can characterize a setting, which is capable of causing an alarm to go off at 6:30 A.M., and the automated assistant to perform the "morning" routine when the alarm is dismissed by the user 118. In some implementations, in response to receiving the spoken utterance 106, the automated assistant can determine multiple different conditions, which when satisfied, cause the particular operations defined by the spoken utterance 106 to be performed. For example, the client data 116 can characterize a condition that includes a parameter characterizing a user input for dismissing the alarm, therefore when such a user input is received, the condition can be satisfied. The client data 116 can also characterize as a condition that includes another parameter characterizing an event input for causing an alarm operation to initialize. The other parameter can characterize the event input as a temporal arrival of a clock time, therefore, when the clock time occurs, the alarm can be emitted by the assistant device 110 and/or any other device associated with the user 118.

Figure 1B:
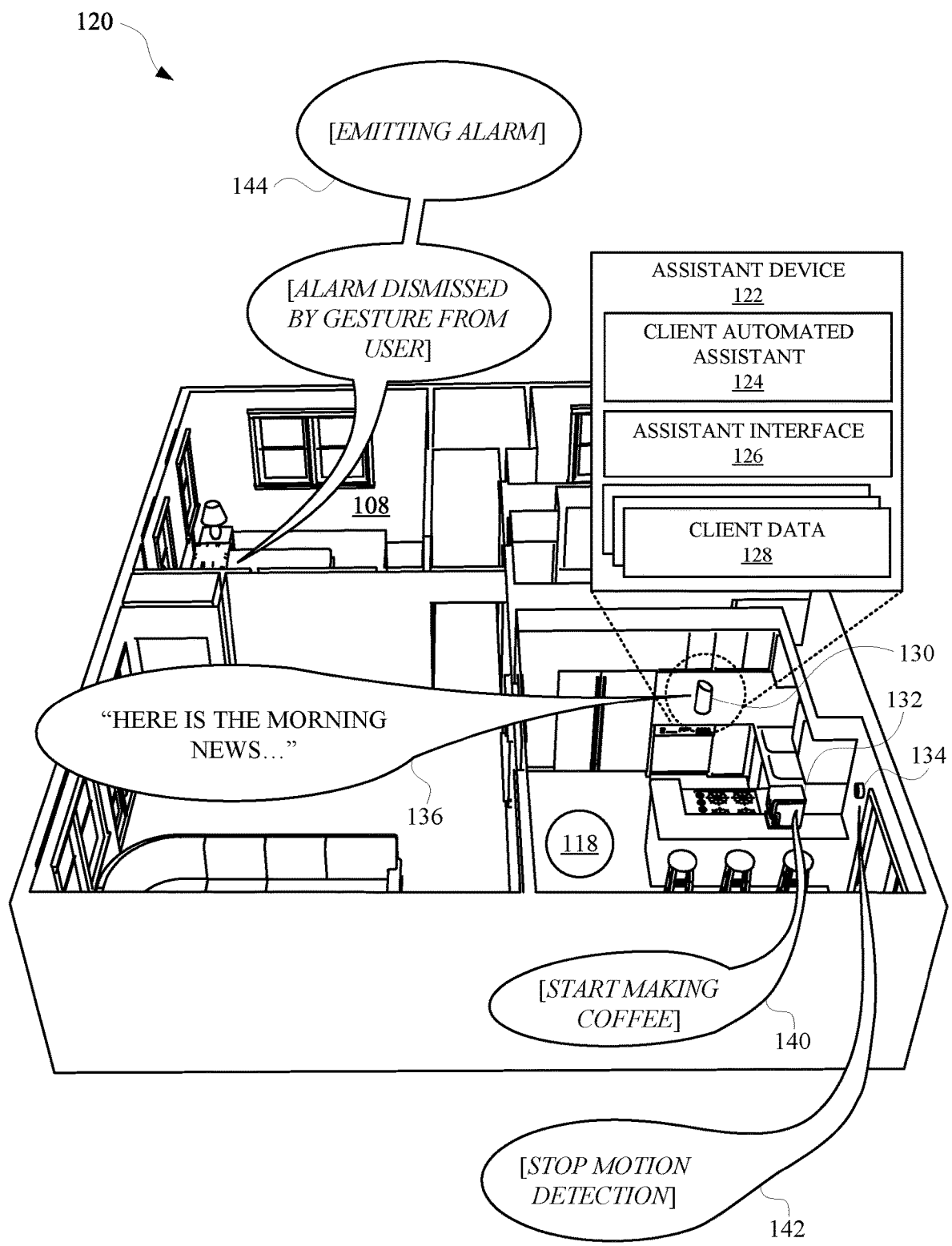
FIG. 1B illustrates a view of a user causing an automated assistant to perform a routine in response to a gesture that is directed at affecting an ongoing operation being performed by a device.

FIG. 1B illustrates a view 120 of a user 118 causing an automated assistant to perform a routine in response to a gesture that is directed at affecting an ongoing operation being performed by a device. Specifically, FIG. 1B illustrates a home of the user 118 that includes multiple different devices. The assistant device 110 can be located in the room 108, and other devices can be located outside of the room 108. For instance, the user 118 can have another assistant device 122, such as a standalone speaker device 130. Additionally, the user 118 can have other client devices connected with the assistant devices over a local area network. The other client devices can include, for example, a coffee maker 132 and/or a thermostat 134.

According to FIG. 1A, the user has caused a setting to be created for an alarm to go off at a particular time, and an automated assistant routine to be performed when the alarm is dismissed. When the alarm subsequently goes off, as illustrated in FIG. 1B, the alarm can be dismissed by the user 118. For instance, as illustrated in FIG. 1B, the assistant device 110 can be providing an output 144, which can include emitting an alarm. When the alarm is being emitted by the assistant device 110 in the room 108, the user 118 can perform a gesture to indicate a willingness or intention to dismiss the alarm. The gesture for dismissing the alarm can be, for example, a spoken gesture, a gesture performed via motion of an appendage, and/or any other gesture that can be an input to a computing device. In response to the alarm being dismissed by the gesture from the user 118, the automated assistant can initialize performance of the "morning" routine. The initialization of this routine can be based on the setting generated according to FIG. 1A.

The routine to be performed by the automated assistant can be characterized by client data 116, client data 128, and/or any other data that can be accessible to the automated assistant. The client data 128 can characterize one or more actions to be performed when the routine is being executed by the automated assistant. For instance, a client automated assistant 124, accessible via the assistant device 122, can provide the morning news when the routine is being executed. Furthermore, as part of the "morning" routine, the client automated assistant 124 can cause the coffee maker 132 to perform an operation 140 such as starting to make coffee, and cause the thermostat 134 to perform an operation 142 such as stopping motion detection (e.g., as part of a security mode of thermostat 134). In other words, as a result of the setting created at the request of the user 118, when the user 118 dismissed the alarm being emitted by the assistant device 110, the client automated assistant 124 can initialize performance of the "morning" routine.

Causing the automated assistant to perform a routine in this way can reduce a number of user inputs that need to be processed at one or more devices. For example, instead of the user 118 providing a spoken utterance to an assistant interface 126 of the assistant device 122 in order to initialize the "morning" routine, the user 118 can cause the "morning" routine to be performed in response to dismissing the alarm. In some implementations, the initialization of the routine by the automated assistant can be contingent upon who dismissed the alarm. In other words, if someone other than the user 118 dismissed the alarm, the automated assistant can bypass initializing the routine according to the setting. In this way, should the user 118 be traveling or otherwise not home when the alarm is going off, and the alarm is subsequently dismissed by another user, the automated assistant will omit executing the "morning" routine. This can preserve energy and computational resources that might otherwise be expended upon performing the routine. Furthermore, this can provide an additional level of security for the user and/or other users within the home. Voice identification can be used to determine whether the user 118 or a different user is dismissing the alarm. Alternatively, or additionally, various environmental data and/or user data can be used to determine whether the user 118 is the person dismissing the alarm, or whether the alarm is being dismissed by someone other than the user 118.

Figure 2A:
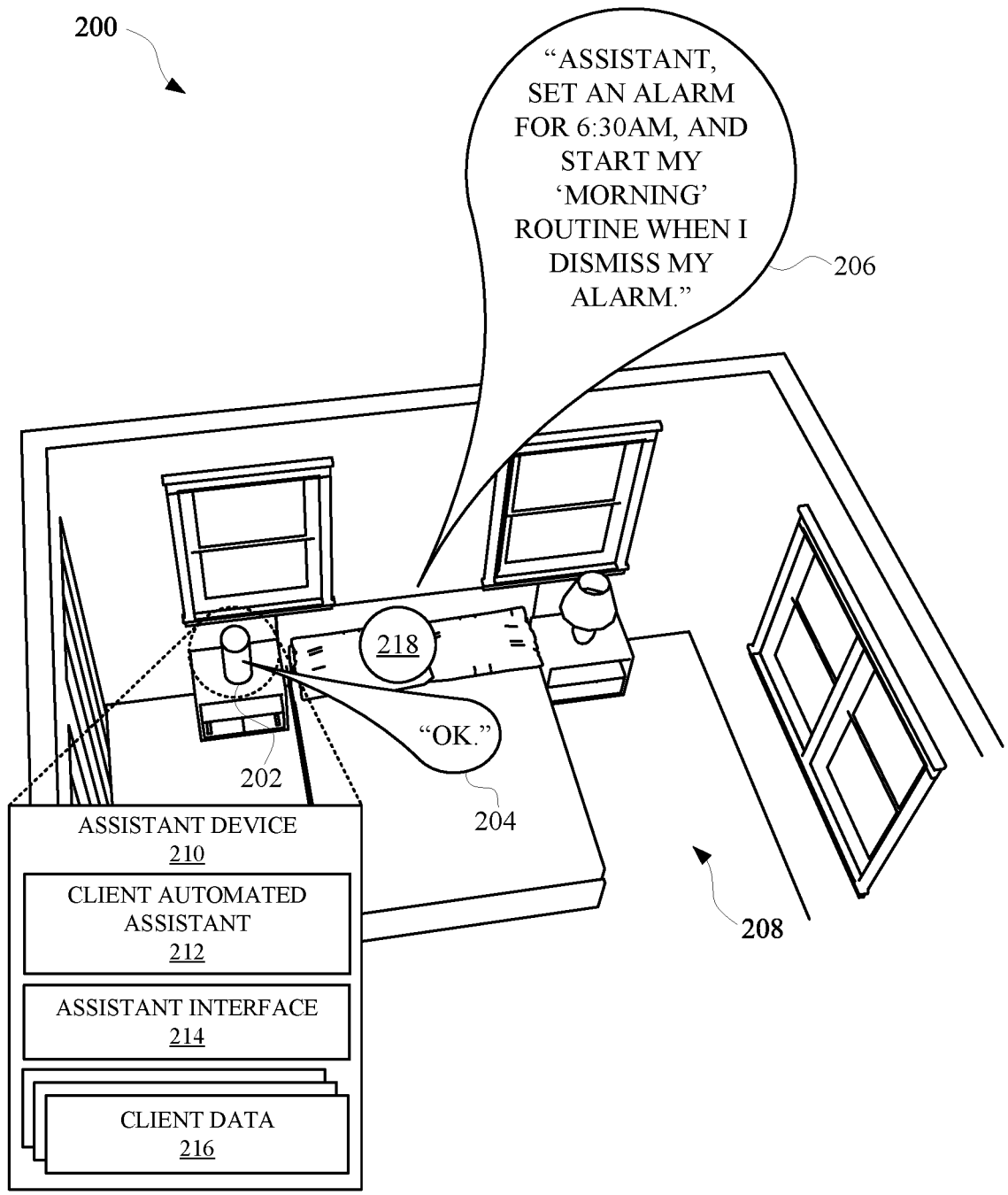
FIG. 2A illustrates a view of a user causing a setting to be generated for invoking an automated assistant in response to the user affecting an operation to be performed by a computing device.

FIG. 2A illustrates a view 200 of a user 218 causing a setting to be generated for invoking an automated assistant in response to the user affecting an operation to be performed by a computing device. Specifically, the user 218 can request that an automated assistant perform a routine in response to the user affecting another operation performed by the computing device. In response to the request from the user 218, the automated assistant can determine multiple different conditions that can be satisfied in order for the automated assistant to perform the routine. For example, when the user 218 is in their room 208 with an assistant device 210, such as a standalone speaker device 202, the user 218 can provide a spoken utterance 206. The spoken utterance 206 can be, for example, "Assistant, set an alarm for 6:30 A.M., and start my morning routine when I dismiss my alarm." The spoken utterance 206 can be received at an assistant interface 214 of the assistant device 210. A client automated assistant 212 that is available at the standalone speaker device 202 can generate client data 216 in response to receiving the spoken utterance 206. The client data 216 can characterize one or more conditions that, when satisfied, cause the automated assistant to perform the routine without the user necessarily providing a spoken utterance that identifies the routine.

For example, in response to receiving the spoken utterance 206, the client automated assistant 212 can cause client data 216 to be generated for characterizing a user input condition. The user input condition can include a parameter of receiving a user input for dismissing the alarm. When the user input for dismissing the alarm is received, the user input condition can be considered satisfied, and the automated assistant can initialize performance of the morning routine in response. The user input condition can correspond to a user input that expresses a willingness or an intention of the user to stop the alarm when it is being emitted, or stopping the alarm from being subsequently emitted. For example, prior to a time that the alarm is set to go off, but after a time that the user has been sleeping for a threshold period of time, the user can provide an input indicating that they would like the impending alarm to be dismissed despite the alarm having not gone off yet.

Alternatively, or additionally, in response to receiving the spoken utterance 206, the client automated assistant 212 can generate client data 216 for characterizing an event condition. The event condition can include one or more parameters for an occurrence of an event. For instance, a temporal arrival of a particular clock time can be an occurrence of an event that satisfies the event condition. Alternatively, the event can be one or more other time dependent activities that can be acknowledged by a computing device. When the event condition is satisfied, the alarm can be emitted by the standalone speaker device 202 in order to wake the user. Furthermore, according to the setting requested by the user, when the event condition is satisfied, the automated assistant can initialize performance of a "morning" routine. In this way, the automated assistant can initialize performance of a routine without necessarily requiring the user to provide another spoken utterance subsequent to the spoken utterance 206.

Additionally, or alternatively, in response to receiving the spoken utterance 206, the client automated assistant 212 can generate client data 216 for characterizing a situational condition. A situational condition can include one or more parameters for characterizing one or more particular situations. The automated assistant can determine that a particular situation is apparent or ongoing based on data from one or more devices. For example, a situational condition can include one or more parameters for characterizing a situation in which the user is moving about their home outside of the room 208. The parameters can include a threshold level of audio data collected by a device outside of the room 208, a threshold level of motion detected by a device outside of the room 208 and/or inside of the room 208, a threshold amount of interaction between the user and one or more devices, and/or any other information that can indicate a particular situation that is apparent or ongoing. When the situational condition is satisfied prior to a clock time that is set for the alarm, the alarm can be preemptively dismissed and the automated system can initialize performance of the "morning" routine. When the situational condition is satisfied at, or after, a time when the alarm is set to go off, an output corresponding to the alarm can be dismissed, and the automated assistant can initialize performance of the morning routine.

Figure 2B:
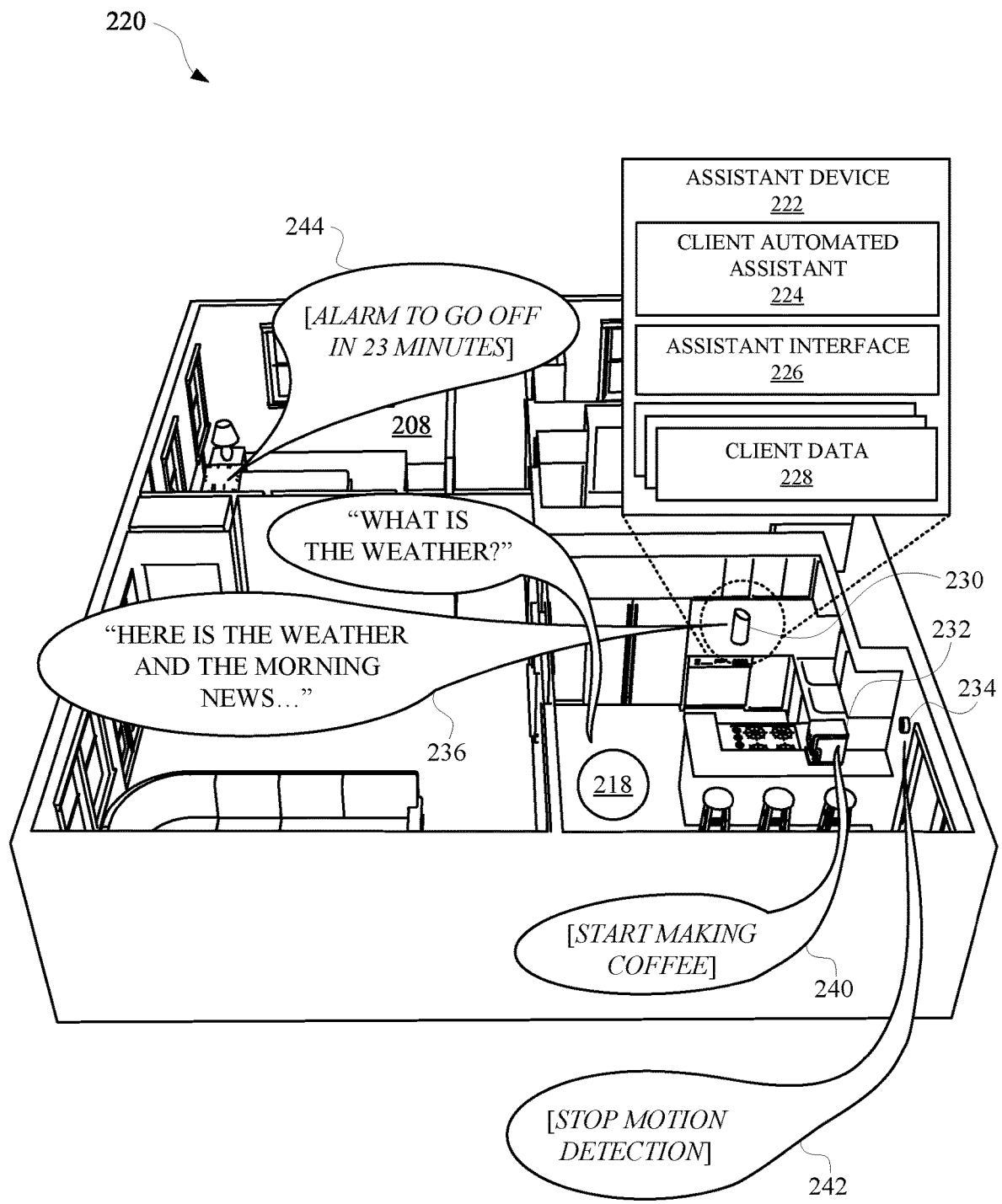
FIG. 2B illustrates a view of the user causing the alarm to be pre-emptively dismissed based on one or more actions performed prior to the alarm going off.

FIG. 2B illustrates a view 220 of the user 218 causing the alarm to be pre-emptively dismissed based on one or more actions performed prior to the alarm going off. For example, a setting 244 of the assistant device 210 can operate to effectively cause an alarm to go off in 23 minutes from a current time period. Regardless, the user 218 can cause the alarm to be pre-emptively dismissed by causing a situational condition to be satisfied. The situational condition can include parameters for the user invoking the automated assistant, the user moving outside of the room 208, and/or the user otherwise interacting with a device within their home, and/or outside of their home, prior to the scheduled time that the alarm is to go off. For instance, FIG. 2B illustrates the user 218 providing, to an assistant device 222, a query such as, "What is the weather?" The query provided by the user 218 can be provided before a time that the alarm is scheduled to go off, thereby indicating to the assistant device 222 that the user is awake prior to the alarm going off. In some implementations, motion can be detected by a particular device (e.g., a thermostat 234) within the home of the user prior to a time when the alarm is configured to go off. Such detection in combination with one or more other detected activities can indicate that the user is awake prior to the alarm going off, or is otherwise interested in the alarm being dismissed prior to the alarm going off.

In response to the alarm being preemptively dismissed, a client automated assistant 224 can be notified that the alarm has been pre-emptively dismissed. Furthermore, in response to the alarm being pre-emptively dismissed, the client automated assistant 224 can initialize performance of the "morning" routine. Client data 228 can be stored at the client assistant device 224, and/or a separate device such as server device, and can characterize one or more actions to be performed according to the routine. For example, the morning routine can include an action of causing the client automated assistant 224 to provide the morning news, an action 240 of initializing a coffee maker 232 to make coffee, and an action 242 of causing a thermostat 234 to exit a security mode and stop motion detection.

In some implementations, when the situational condition is satisfied by the user 218 providing a query or command to the client automated assistant 224, an action to be performed according to the routine can be modified according to the query or command. For example, when the situational condition is satisfied by the user 218 providing the query, "What is the weather?" the subsequent routine action of providing the morning news can be modified to include providing the weather. As a result, an assistant interface 226 of the assistant device 222 can provide a natural language output 236 such as, "Here is the weather and the morning news . . . " In this way, a "domino effect" can occur, at least with respect to various device operations, in response to the user interacting with the automated assistant prior to a time at which the alarm is configured to go off. Such an effect can reduce a number of inputs that the user needs to provide in order to cause the automated assistant to perform the same amount of activity. Furthermore, reducing a number of such inputs, such as spoken utterances to be received at an assistant interface 226, can preserve computational resources and network resources.

When processing natural language inputs, computational resources can be expended on converting speech to text, and parsing text for determining content of the text. Furthermore, processing natural language inputs can often require audio data and/or other data to be transmitted over a network for additional processing, there by consuming bandwidth. Therefore, by inferring certain user-invoked activity as a willingness or intention for particular operations of a device to be initialized or dismissed, such resources can be preserved at a time when predictability of the user intentions may not be particularly high. Specifically, pre-emptively dismissing an alarm according to one or more user activities can be a reasonable indicator that the user would prefer any actions or routines contingent upon the alarm to be performed, despite the alarm not actually going off at a set time.

Figure 3:
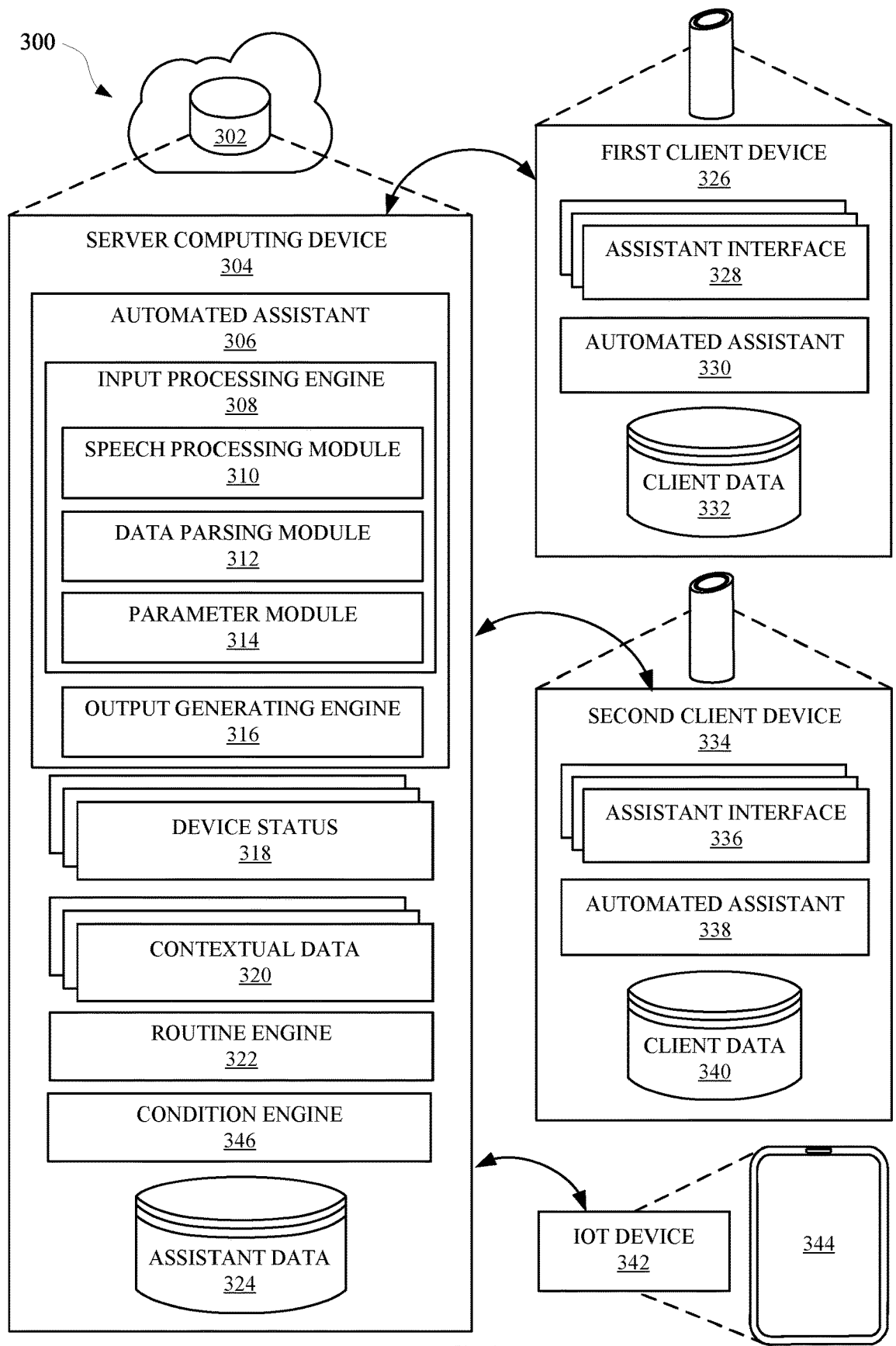
FIG. 3 illustrates a system for enabling a user to pre-emptively dismiss a scheduled operation and/or cause an automated assistant to perform one or more actions in response to a scheduled operation being pre-emptively dismissed.

FIG. 3 illustrates a system 300 for enabling a user to pre-emptively dismiss a scheduled operation and/or cause an automated assistant 306 to perform one or more actions in response to a scheduled operation being pre-emptively dismissed. The automated assistant 306 can operate as part of an assistant application that is provided at one or more computing devices, such as a first client device 326, a second client device 334, and/or a remote computing device 302, such as a server computing device 304. A user can interact with the automated assistant 330 via one or more assistant interfaces 328, which can include one or more of a microphone, a camera, a touch screen display, a user interface, and/or any other apparatus capable of providing an interface between a user and an application. For instance, a user can initialize the automated assistant 330 by providing a verbal, textual, or a graphical input to the assistant interface to cause the automated assistant 330 to perform a function (e.g., provide data, control a peripheral device, access an agent, etc.). The first client device 326 can include a display device, which can be a display panel that includes a touch interface for receiving touch inputs and/or gestures for allowing a user to control applications of the first client device 326 via the touch interface. In some implementations, second client device 334 can lack a display device, thereby providing an audible user interface output, without providing a graphical user interface output. Furthermore, the second client device 334 can provide a user interface, such as a microphone, for receiving spoken natural language inputs from a user.

The first client device 326 and the second client device 334 can be in communication with the remote computing device 302 over a network, such as the internet. The first client device 326 and the second client device 334 can offload computational tasks to the remote computing device 302 in order to preserve computational resources at each of the first client device 326 and the second client device 334. For instance, the remote computing device 302 can host an automated assistant 306, and the first client device 326 and the second client device 334 can transmit inputs received at one or more assistant interfaces to the remote computing device 302. However, in some implementations, the automated assistant 306 can be hosted at the first client device 326 or the second client device 334. In various implementations, all or less than all aspects of the automated assistant 306 can be implemented on the server computing device 304, the first client device 326, and/or the second client device 334. In some of those implementations, aspects of the automated assistant 306 are implemented via a local assistant application of the first client device 326 or the second client device 334 and interface with the remote computing device 302, which can implement other aspects of the automated assistant 306. The remote computing device 302 can optionally serve a plurality of users and their associated assistant applications via multiple threads. In implementations where all or less than all aspects of the automated assistant 306 are implemented via a local assistant application of the first client device 326 or the second client device 334, the local assistant application can be an application that is separate from an operating system of the first client device 326 or the second client device 334 (e.g., installed "on top" of the operating system)—or can alternatively be implemented directly by the operating system of the first client device 326 or the second client device 334 (e.g., considered an application of, but integral with, the operating system).

In some implementations, the automated assistant 306, automated assistant 330, and/or automated assistant 336 can include an input processing engine 308, which can employ multiple different modules for processing inputs and/or outputs for the first client device 326 and/or the second client device 334. For instance, the input processing engine 308 can include a speech processing module 310 that can process audio data received at an assistant interface 328 and/or an assistant interface 336 to identify the text embodied in the audio data. The audio data can be transmitted from, for example, the first client device 326 to the server computing device 304 in order to preserve computational resources at the first client device 326.

The process for converting the audio data to text can include a speech recognition algorithm, which can employ neural networks, word2vec algorithms, and/or statistical models for identifying groups of audio data corresponding to words or phrases. The text converted from the audio data can parsed by a data parsing module 312 and made available to the automated assistant as textual data that can be used to generate and/or identify command phrases from the user. In some implementations, output data provided by the data parsing module 312 can be provided to a parameter module 314 to determine whether the user has provided an input that corresponds to a particular action and/or routine capable of being performed by the automated assistant and/or an application or agent that is capable of being accessed by the automated assistant. For example, assistant data 324 can be stored at the server computing device 304 and/or the first client device 326, as client data 332, and can include data that defines one or more actions capable of being performed by the automated assistant 306, as well as parameters necessary to perform the actions.

When the input processing engine 308 has determined that a user has requested a particular action or routine be performed, the parameter module 314 can determine one or more parameters for the particular action or routine, and an output generating engine 316 can then provide an output to the user based on the particular action, routine, and/or the one or more parameters. For instance, in some implementations, in response to a user input, such as a gesture directed at the first client device 326, the automated assistant 330 can cause data, which characterizes the gesture, to be transmitted to the server computing device 304 for determining the action that the user is intending the automated assistant 330 and/or automated assistant 306 to perform.

In some implementations, the automated assistant 330, the first client device 326, the second client device 334, and/or the server computing device 304 can be responsive to one or more different types of gestures directed at the first client device 326. For instance, when the first client device 326 includes a speaker, a type of gesture that can be used to control the volume can be a two-dimensional gesture (e.g., swiping a touch screen display or otherwise moving an appendage of the user in at least two-dimensions with or without directly contacting a computing device) or a three-dimensional gesture (e.g., rotating two fingers on the touch screen display or otherwise moving an appendage of the user in at least three-dimensions with or without directly contacting a computing device).

In some implementations, a user can request that the automated assistant 330 perform a routine when the automated assistant 330 determines that the user is awake. For instance, the user can provide a spoken utterance to an assistant interface 328, such as, "Assistant, when I wake up, please perform my work routine." The first client device 326 can receive the spoken utterance and convert the spoken utterance to client data 332, which can be transmitted to the server computing device 304 for further processing. An input processing engine 308 of the server computing device 304 can parameterize the received client data and determine a setting to be generated in response to receiving the client data. For instance, a routine engine 322 can identify a routine that the user is specifically requesting be performed when the automated assistant determines that the user is awake. The routine can be identified using data generated from audio data that is based on the spoken utterance. When the routine has been identified, the server computing device 304 can generate a setting that will cause the work routine to be performed when the automated assistant 330 determines that the user is awake. The setting can be stored as assistant data 324 at the server computing device 304, and can be stored locally at the first client device 326 and/or the second client device 334.

The "work routine" can include one or more different actions to be performed by the automated assistant 306, the automated assistant 330, the automated assistant 338, and/or any other application or agent capable of interacting with a computing device. For example, a work routine can include an action of initializing a display panel 344 of an internet of things (IoT) device 342 to graphically present morning news, and an action of causing the second client device 334 to audibly present a current day's schedule for the user from an assistant interface 336, such as an audio speaker.

In order to effectively employ the setting for invoking the "work routine" in response to the user waking up, the automated assistant should also be able to determine whether the user is awake, at least to a particular degree. Determining whether the user is awake can be based on data that characterizes device statuses 318, such as operating statuses for the first client device 326, the second client device 334, the IoT device 342, the server computing device 304, and/or any other device or module capable of interacting the user. For instance, a change in device status from emitting an alarm to having the alarm dismissed by the user can be an indication that the user is awake. Alternatively, or additionally, a change from a sleep state for the second client device 334 to an on state, and a user providing a spoken utterance, can both indicate that the user is awake, if the user was determined to be sleep for a threshold period of time immediately prior to the awake indications. Alternatively, or additionally, device statuses 318 and contextual data 320 can be used to determine whether a user is awake. For example, both a change in device status and an indication, from the contextual data 320, that the user is moving about their home, can indicate to the automated assistant that the user is awake. In response to determining the user is awake, the automated assistant can initialize performance of the work routine.

In some implementations, device statuses 318 and/or contextual data 320, accessed prior to a scheduled operation, such as an alarm, can indicate that the user is awake and, in response, cause the automated assistant to perform the work routine. For example, prior to a time when the alarm is scheduled to go off, an IoT device 342 can detect the presence of the user and the second client device 334 can receive a spoken utterance from the user, such as, "Assistant, turn on the lights." In response to detecting the presence of the user, receiving the spoken utterance, and/or turning on the lights, the server computing device 304 and/or the first client device 326 can determine that the user is awake. In some implementations, in response to determining that the user is awake prior to a scheduled operation, the automated assistant can cause a scheduled operation be performed prior to an originally scheduled time, and/or cause the scheduled operation to be bypassed at the scheduled time. Furthermore, in response to determining that the user is awake, and according to a setting requested by the user, the automated assistant can initialize performance of one or more actions or one or more routines. In this way, when the scheduled operation is an alarm, the user can initialize performance of the routine and dismiss their alarm with less inputs than would otherwise be required. This can reduce a number of inputs that need to be processed by one or more devices of FIG. 3, and can preserve network bandwidth, as less audio data corresponding to spoken utterances would need to be transmitted between devices for processing.

In some implementations, a determination as to whether a scheduled operation should be dismissed and/or adjusted in time of/for performance, can be based on learned behavior of the user and/or any other person that can interact with the automated assistant. For example, a user may interact with the first client device 326 in order to reset their alarm just before it was scheduled to go off. Although the user would likely be awake under the circumstances, it may be a waste of resources to initialize performance of an automated assistant routine under such circumstances, since the user may be adjusting their alarm in order to sleep longer. Therefore, in order to determine whether the user is awake, and therefore willing to have the routine be performed, contextual data 320 and/or device statuses 318 can be accessed to determine whether the user is awake and would prefer the routine be initialized.

For example, data accessible to the automated assistant can indicate that, after the user's alarm goes off, the user typically requests the automated assistant 330 to turn on the lights in their kitchen and the user also typically turns on their IoT device 342. Therefore, the automated assistant can cause assistant data 324 to be generated for characterizing such interactions as an indication that the user is awake. As a result, should the user perform such actions prior to, or during, their alarm going off, such interactions can cause the alarm to be dismissed (or pre-emptively dismissed) and cause the automated assistant routine to be initialized. In some implementations, a condition engine 346 can process assistant data 324, contextual data 320, device statuses 318, and/or any other data to determine whether one or more conditions have been satisfied for affecting a scheduled operation and/or one more actions to be performed by an automated assistant. The condition engine 346 can process such data to determine parameters for satisfying particular conditions, such as, but not limited to, a user input condition, a situational condition, and/or an event condition, as discussed herein. When one or more conditions, corresponding to a particular setting requested by the user, are satisfied, one or more actions, routines, and/or operations associated with the particular setting can be affected by satisfaction of the one or more conditions.

Figure 4A:
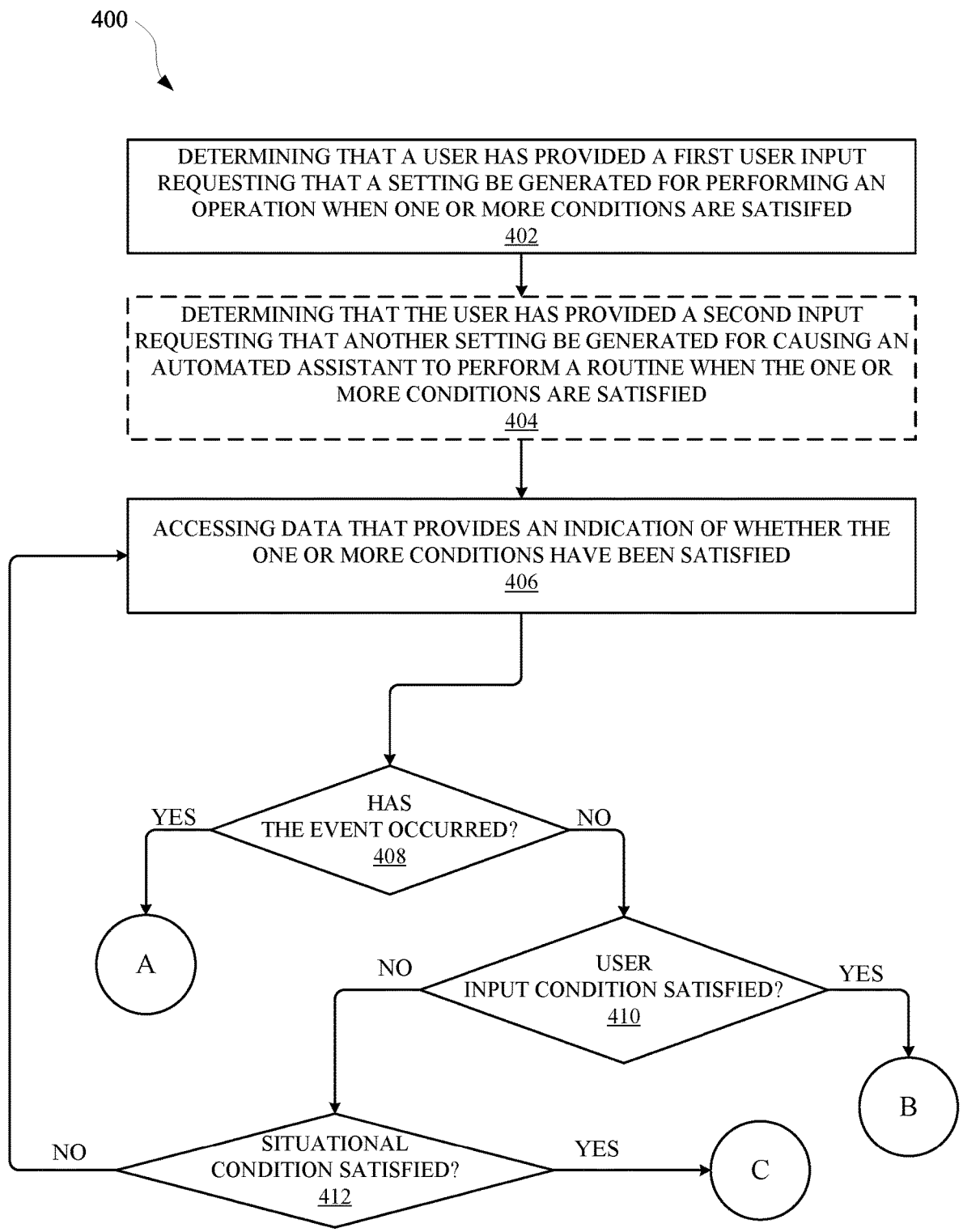
FIG. 4A and FIG. 4B illustrate methods for pre-emptively dismissing a forthcoming and/or anticipated scheduled operation when one or more conditions are satisfied.
Figure 4B:
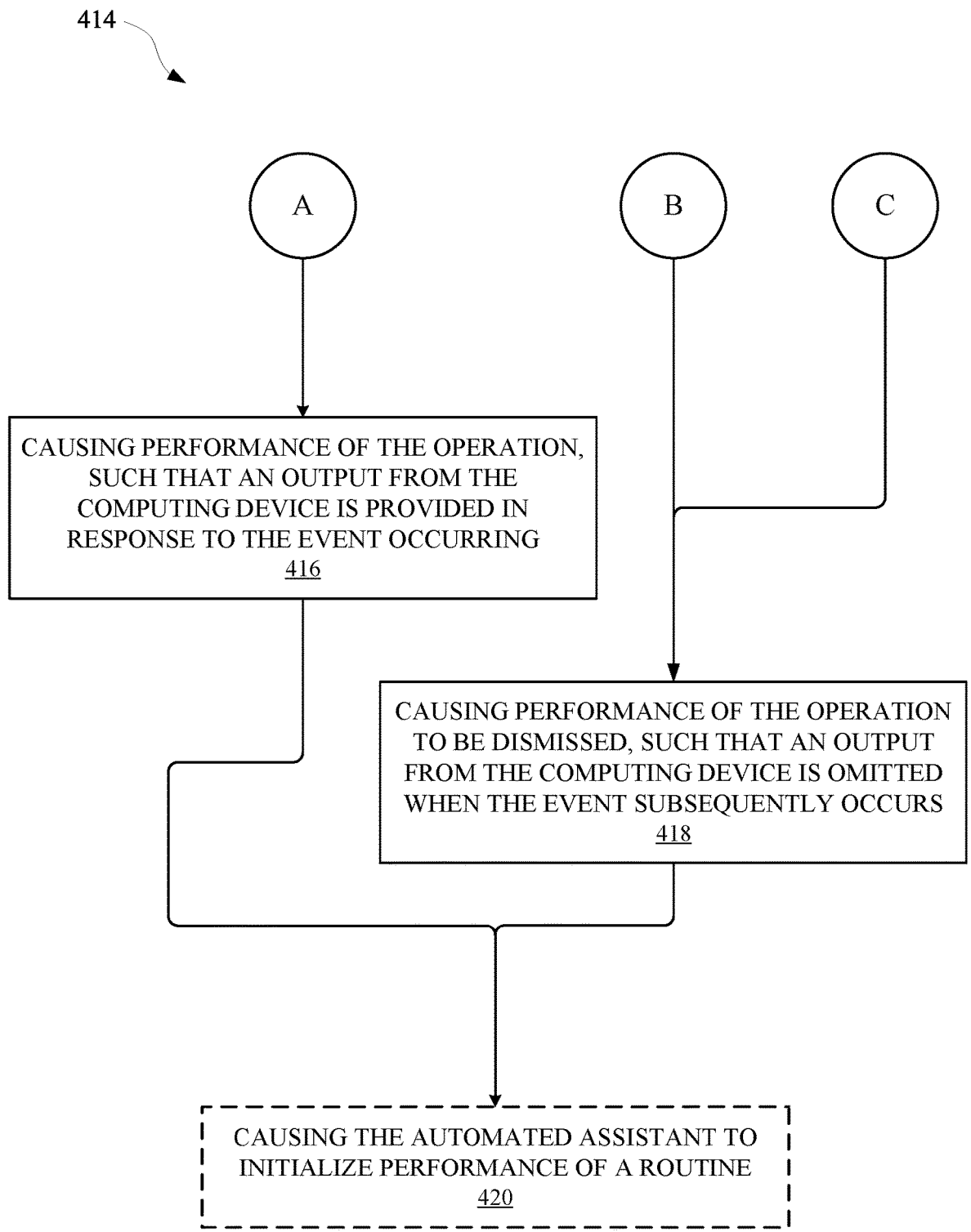

FIG. 4A and FIG. 4B illustrate a method 400 and a method 414 for pre-emptively dismissing a forthcoming and/or anticipated scheduled operation when one or more conditions are satisfied. The method 400 and the method 414 can each be performed by one or more computing devices, applications, and/or any other apparatus or module capable of storing or accessing a schedule. The method 400 can include an operation 402 of determining that a user has provided a first user input requesting that a setting be generated for performing an operation when one or more conditions are satisfied. For example, the user can provide a first input via an automated assistant for establishing an alarm that will go off the following morning. The first input can be, for example, a spoken utterance such as, "Assistant, please set an alarm for 6 A.M. tomorrow morning." The spoken utterance can be received at an automated assistant interface of a computing device, such as a microphone of the computing device. In response to the computing device receiving the spoken utterance, audio data can be generated for characterizing the spoken utterance. The audio data can be processed at the computing device and/or transmitted to a separate computing device for processing. Based on the processing, the computing device can establish a setting for causing an audible sound to be emitted from a speaker of the computing device when a temporal arrival of the clock time (e.g., 6 A.M.) occurs the following morning. The temporal arrival of the clock time can be characterized as an event condition that, when satisfied, causes the alarm sound to be emitted by the computing device.

In some implementations, in response to the user requesting the setting be generated, the computing device and/or the automated assistant can establish one or more other conditions that, when satisfied, cause the computing device to perform or bypass the requested operation. For example, the automated assistant can cause a user input condition to be established such that, when one or more user inputs are received prior to an event, corresponding to the event condition, the requested operation can be performed or bypassed when the event occurs. Additionally, or alternatively, the computing device and/or the automated assistant can establish yet another one or more conditions that, when satisfied, cause the computing device to perform or bypass the requested operation. For example, the automated assistant can cause a situational condition to be established such that, when data accessible to the automated assistant indicates that a particular situation and/or context is apparent, prior to an event corresponding to the event condition, the requested operation can be performed or bypassed when the event occurs. In some implementations, a user input, such as a spoken utterance to the automated assistant, can satisfy the user input condition. Alternatively, or additionally, a situation or a context that can satisfy the situational condition, can include the user turning on a light within their home.

The method 400 can further include an optional operation 404 of determining that the user has provided a second user input requesting that another setting be generated. Specifically, the second user input can correspond to a request for causing the automated assistant to perform a routine when one or more conditions are satisfied. For instance, the user can provide a spoken utterance such as, "Assistant, when I dismiss my alarm, please perform my 'prepare for work' routine." In response to receiving the spoken utterance, the computing device and/or the automated assistant can generate a setting for performing the 'prepare for work' routine when one or more conditions are satisfied. The one or more conditions can include at least one condition selected from a user input condition, a situational condition, and/or an event condition. In some implementations, a situational condition can be learned over time, by the automated assistant and with permission from the user, as the user takes particular actions associated with the requested setting. For example, despite the user requesting that the 'prepare for work' routine be performed when the user dismisses their alarm, the routine can nonetheless be performed when they perform certain actions that indicate a willingness or interest in dismissing their alarm. For example, initially a user may not have a coffee machine in their home when they have made the aforementioned request. However, should the user purchase a coffee machine and use the coffee machine to make coffee each morning before work, the automated assistant can acknowledge such behavior. Furthermore, the automated assistant can generate data that characterizes the behavior as an indication that the user is awake and/or otherwise expressing a willingness to dismiss their alarm. Therefore, subsequent to the data being generated by the automated assistant, when the user makes coffee in the morning prior to a time that is set for their alarm, such an action can be acknowledged by the automated assistant and satisfy a situational condition for dismissing the alarm and, optionally, invoking the automated assistant to perform the 'prepare for work' routine.

The user input condition, which can be established for invoking the automated assistant to perform the routine, can be, for example, an action of the user explicitly dismissing the alarm when the alarm is going off. The event condition, which can be established for invoking the automated assistant to perform the routine, can be, for example, a temporal arrival of the clock time corresponding to a time at which the user requested that the alarm go off. In this way, duplicative user inputs do not necessarily need to be provided by the user in order to cause various actions to be performed by the automated assistant, and/or any other computing device.

The method 400 can further include an operation 406 of accessing data that provides an indication of whether the one or more conditions have been satisfied. The data can be generated and/or provided by the computing device, the automated assistant, a server device that is in communication with the computing device and/or at the automated assistant, and/or any other application or device capable of interacting with the automated assistant. For example, the data can be provided by one or more Internet of Things (IoT) devices, such as an appliance that is connected to the internet. Therefore, the data can characterize one or more interactions between the user and the appliance. For example, when the appliance is a copy machine in a kitchen of a home of the user, the data can indicate whether the user has caused a performance of a coffee making process at the coffee machine.

The method 400 can further include an operation 408 of determining, based on the data, whether the event has occurred. The event can be any occurrence corresponding to, or identified by, data that is associated with the event condition. Specifically, the event condition can be stored as data that includes a parameter identifying how the event condition can be satisfied. When the event condition corresponds to an alarm, the parameter can identify a clock time at which the alarm is set to go off. Therefore, when the data indicates that a temporal arrival of the clock time has occurred, the method 400 can proceed to continuation element "A," which indicates that the method 400 proceeds from continuation element "A" of FIG. 4A and continues to method 414 at continue element "A" at FIG. 4B.

When the data indicates that the event has not occurred, the method 400 can proceed to operation 410, which can include a determination of whether a user input condition has been satisfied. A user input condition can refer to a direct or indirect user input being received at one or more particular devices. For example, a user input condition can be defined by data that characterizes one or more user inputs that, when provided by a user prior to the event occurring, will satisfy the user input condition. When the operation to be performed is an alarm that is set by the user, a user input condition can be the user specifically requesting that the alarm be dismissed prior to the time at which the alarm was supposed to go off.

Alternatively, or additionally, the user input condition can correspond to the user interacting with the automated assistant. For example, if the user interacts with the automated assistant within a threshold period of time before the alarm supposed to go off, the user input condition can be considered satisfied. For instance, the user can provide a spoken utterance to a particular device for invoking the automated assistant to cause a web search to be performed at the direction of the automated assistant. If this occurs prior to the event occurring, this interaction can indicate that the user is awake prior to their alarm going off, and it can therefore be assumed by the automated assistant that the alarm is no longer necessary. When the user input condition is satisfied, the method 400 can proceed to the method 414 via continuation element "B." Specifically, continuation element "B" can represent a continuation point between the method 400 and the method 414, which also includes the continuation element "B."

When the user input condition has not been satisfied at operation 410, the method 400 can proceed to operation 412. The operation 412 can include determining whether a situational condition has been satisfied. A situational condition can be satisfied in response to one or more devices detecting an activity of the user, with permission from the user. In some implementations, the situational condition can be satisfied when a motion of the user is detected, thereby indicating that the user is awake or in motion prior to the event occurring. Additionally, or alternatively, the situational condition can be satisfied when an input from the user has been received at one or more different devices, such as when the user turns on a light, adjusts a temperature of their home, is detected by one or more sensors (e.g., a microphone or proximity sensor) in the home, and/or when any other change in a situation associated with the user has occurred. When the situational condition has been satisfied, the method 400 can proceed to the method 414 via a continuation element "C," which is illustrated in FIG. 4A and FIG. 4B. When the situational condition has not been satisfied, the method 400 can return to the operation 406 where further data can be accessed to determine whether one or more conditions have been satisfied for performing the operation previously discussed with respect to the operation 402.

The method 414 can proceed from the continuation element "A" to an operation 416, which can include causing performance of the operation, such that an output from the computer device is provided in response to the event occurring. When the event refers to a temporal arrival of a time, an output of the computing device can be provided when that particular time occurs. When the operation refers to an alarm having an audio and/or visual output, the audio and/or visual output can be provided when the temporal arrival of the alarm time occurs.

The method 414 can proceed from continuation element "B" and continuation element "C" to an operation 418, which can include causing performance of the operation to be dismissed, such that an output from the computing device is omitted when the event subsequently occurs. When the operation refers to an alarm, the output can refer to an audio and/or visual output that is provided by the computing device. Therefore, when the performance of the operation is dismissed, the computing device would not provide the audio and/or visual output from the computing device when the event occurs, but rather, the computing device can bypass providing such output in view of the user indicating that they are awake prior to their alarm going off.

The method 414 can optionally include an operation 420 of causing the automated assistant to initialize performance of a routine. The operation 420 can optionally follow the operation 416 or the operation 418, depending on whether one or more particular conditions have been satisfied. Causing the automated assistant to perform the routine in response to either the operation (e.g., the alarm) being performed, or the operation being dismissed, can provide a benefit of decreasing a number of user inputs that need to be processed over a lifetime of one or more computing devices. For instance, some amount of speech processing would necessarily need to be performed if the user was required to provide a spoken utterance to an automated assistant interface every time the user wanted the automated assistant to perform the routine. Furthermore, network bandwidth can be preserved, as the user input would not necessarily need to be transmitted to a remote server for processing. Rather, processing of the user input can be bypassed in view of a willingness of the user to cause the operation (e.g., the alarm) to be dismissed before a particular event occurs.

Figure 5:
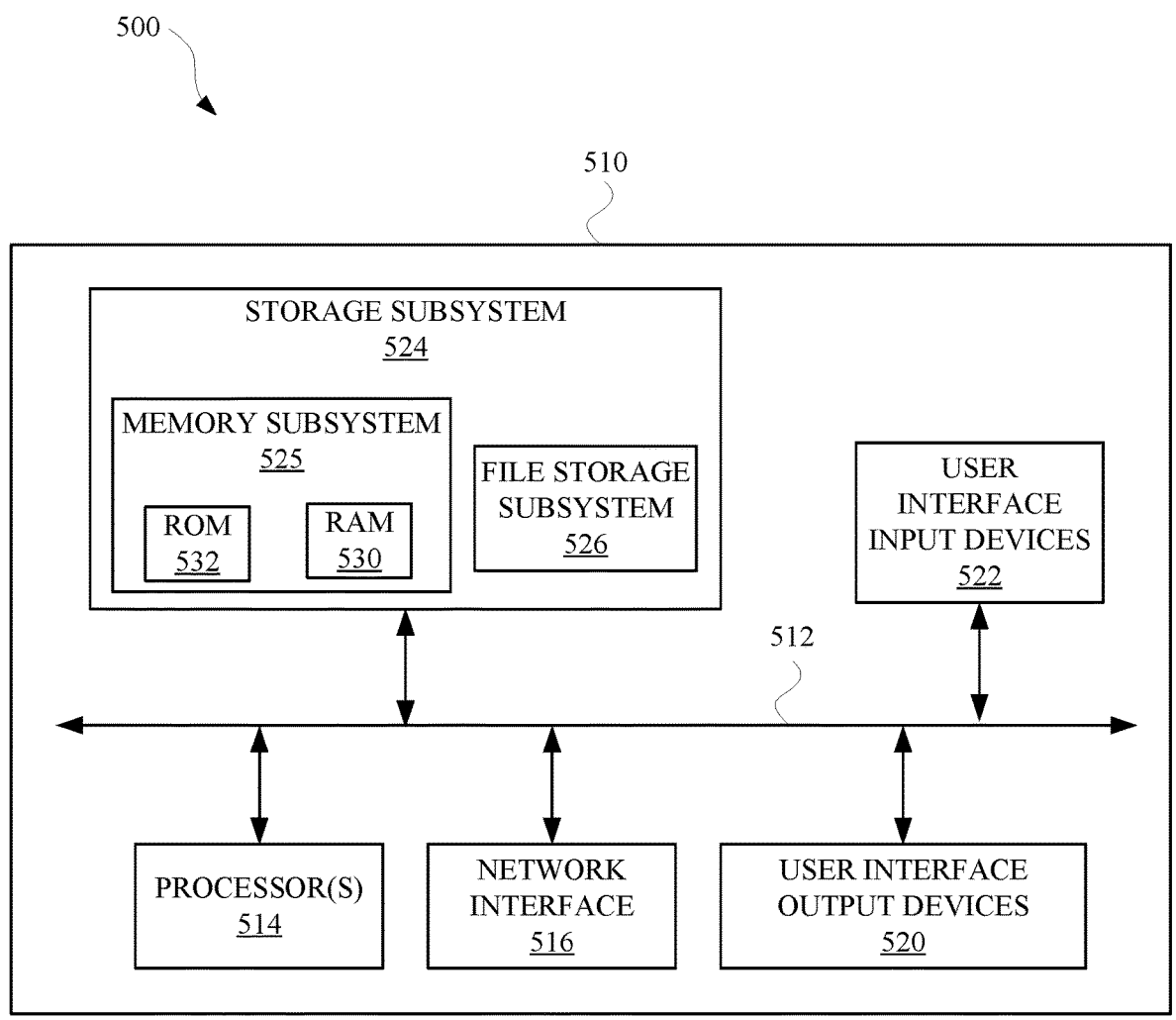
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, method 414, and/or to implement one or more of an automated assistant, automated assistant 110, stand-alone speaker 102, assistant device 110, client automated assistant 124, assistant device 210, client automated assistant 212, assistant device 222, client automated assistant 224, server computing device 304, first client device 326, second client device 334, IoT device 342, and/or any other device, apparatus, module, operation, and/or application discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving a user input that causes a computing device to generate a setting for controlling a wake alarm when any one of one or more conditions is satisfied, wherein the computing device provides access to an automated assistant and the user input is received at an automated assistant interface of the computing device;
   accessing, when the computing device is operating, data that provides an indication of whether any one of the one or more conditions has been satisfied, wherein the one or more conditions include at least an event condition and a situational condition, and
      wherein the situational condition is satisfied when a user has performed one or more interactions with the automated assistant within a threshold period of time of an event corresponding to the event condition, and the one or more interactions are selected to satisfy the situational condition based on one or more other interactions, between the user and the automated assistant, that previously occurred within a period of time of a past occurrence of the event;
   determining, based on accessing the data, whether the data indicates that the any one of the one or more conditions has been satisfied; and
   when the situational condition is determined to be satisfied prior to satisfaction of the event condition:
      causing performance of the wake alarm to be dismissed, such that an output corresponding to the wake alarm is omitted when the event subsequently occurs.

2. The method of claim 1, wherein the event is an occurrence of a particular time and performance of the wake alarm includes causing a sound to be emitted from the computing device or a separate computing device.

3. The method of claim 1, further comprising:
   when the event condition is determined to be satisfied by a temporal arrival of the event:

causing the wake alarm to be executed such that the output, corresponding to the wake alarm, is provided by the computing device or a separate computing device.

4. The method of claim 3, wherein the one or more conditions include at least one condition further selected from a user input condition, and the method further comprises:
when the user input condition is determined to be satisfied prior to the event subsequently occurring:
causing the wake alarm to be dismissed, such that the output, corresponding to the wake alarm, is omitted when the event subsequently occurs.

5. The method of claim 1, wherein the event condition includes at least a temporal parameter that identifies a particular time that, when a temporal arrival of the particular time occurs, causes the event condition to be satisfied.

6. The method of claim 1,
wherein the automated assistant is configured to perform a routine and cause multiple different actions to be initialized when performing the routine, and
wherein the multiple different actions of the routine include causing a separate computing device to perform another wake alarm that causes the separate computing device to provide a different output, which is directly perceivable by a user.

7. The method of claim 6, further comprising:
when the situational condition is determined to be satisfied prior to the event that corresponds to the event condition:
causing the automated assistant to initialize performance of the routine, prior to the event, in response to determining that the situational condition has been satisfied.

8. The method of claim 7, wherein determining whether the data indicates that that any one of the one or more conditions has been satisfied includes determining that the data indicates that the user has provided a spoken utterance, which has invoked the automated assistant prior to the event.

9. The method of claim 8, wherein causing the automated assistant to initialize performance of the routine includes causing the automated assistant to perform an action that is different from a requested action specified by the user via the spoken utterance.

10. A method implemented by one or more processors, the method comprising:
receiving a first user input that causes a computing device to generate a setting for performing an operation when an event occurs, wherein the computing device provides access to an automated assistant that is configured to perform a routine and cause multiple different actions to be initialized when performing the routine;
receiving a second user input that causes the automated assistant to generate another setting for performing the routine when any one of one or more conditions is satisfied, wherein the one or more conditions include at least one condition selected from a user input condition, and the user input condition is satisfied when a user has caused the operation to be dismissed during a particular time selected from a time prior to the event and another time after the event;
accessing, subsequent to the first user input and the second user input, data that provides an indication of whether the any one of the one or more conditions has been satisfied;
determining, based on accessing the data, that the data indicates that the any one of the one or more conditions has been satisfied; and
when the data indicates the user input condition has been satisfied at the time prior to the event:
causing performance of the operation to be dismissed, such that an output, to be provided by the computing device and corresponding to the operation, is omitted when the event subsequently occurs, and
causing the automated assistant to initialize performance of the routine, prior to the event, in response to determining that the any one of the one or more conditions has been satisfied.

11. The method of claim 10, wherein the data indicates that the user input condition has been satisfied by a third user input for causing the operation to be dismissed at the time prior to the event.

12. The method of claim 11, wherein the third user input is a physical gesture, the operation is the computing device providing an audible alarm output, and the event is a temporal arrival of a particular clock time.

13. The method of claim 10, further comprising:
when the data indicates that the user input condition has been satisfied at the other time after the event:
causing the output, being provided by the computing device according to the setting, to be dismissed in response to a third user input from the user, and
causing, in response to the third user input from the user, the automated assistant to initialize performance of the routine at the other time after the event.

14. The method of claim 10, wherein the one or more conditions include at least one condition further selected from a situational condition, and the method further comprises:
when the data indicates that the situational condition has been satisfied at the time prior to the event:
causing performance of the operation to be dismissed, such that the output, to be provided by the computing device and corresponding to the operation, is omitted when the event subsequently occurs, and
causing the automated assistant to initialize performance of the routine, prior to the event, in response to determining that the situational condition has been satisfied.

15. The method of claim 14, wherein the situational condition includes at least an input parameter that identifies a particular user input that, when received at a separate computing device, causes the data to be generated for indicating that the situational condition has been satisfied.

16. The method of claim 15, wherein the particular user input corresponds to a spoken utterance, provided by the user, to an automated assistant interface of the separate computing device, and the spoken utterance characterizes a request for the automated assistant to perform a particular action that is omitted from the routine.

17. A method implemented by one or more processors, the method comprising:
receiving data that characterizes a first operational status of a first computing device and a second operational status of a second computing device, wherein each of the first computing device and the second computing device provide access to an automated assistant that is configured to be responsive to natural language inputs from a user and perform a routine that includes initializing multiple different actions to be performed;
determining, based on the data, that the first operational status indicates the first computing device is scheduled to perform an operation in response to at least an event condition being satisfied, and the second operational status indicates that the second computing device is to perform an action of an automated assistant routine in response to a condition being satisfied, wherein the condition is a particular condition selected from a user input condition, a situational condition, and the event condition;

receiving, subsequent to receiving the data, other data that characterizes a presence of the user within an environment that includes the first computing device and the second computing device;

determining, based on the other data, whether the condition has been satisfied; and when the situational condition is determined, based on the other data, to have been satisfied prior to an event that corresponds to the event condition:

causing performance of the operation to be dismissed, such that an output, to be provided by the first computing device and corresponding to the operation, is omitted when the event subsequently occurs, and causing the automated assistant to initialize performance of the routine, prior to the event, in response to determining that the situational condition has been satisfied.

18. The method of claim 17, further comprising:

when the event condition and the situational condition are determined, based on the data, to be satisfied and the first computing device is providing the output subsequent to the event:

causing the first computing device to discontinue providing the output, and causing the automated assistant to initialize performance of the routine, prior to the event, in response to determining that the situational condition has been satisfied.

19. The method of claim 18, wherein the event is a temporal arrival of a clock time and the situational condition is satisfied when, at least, the presence of the user, characterized by the other data, indicates the user has changed locations within the environment.

20. The method of claim 19, wherein the output is an audible output that is directly perceivable by the user, and is provided by the first computing device via a speaker that is configured to provide a natural language output to the user during performance of the routine by the automated assistant.

* * * * *